US012319874B2

(12) United States Patent
Saffrin et al.

(10) Patent No.: US 12,319,874 B2
(45) Date of Patent: Jun. 3, 2025

(54) CORBEL FOR A COKE OVEN OR COKE OVEN BATTERY

(71) Applicant: VANOCUR REFRACTORIES LLC, Tonawanda, NY (US)

(72) Inventors: Paul A. Saffrin, Tonawanda, NY (US); Richard M. Maida, Tonawanda, NY (US)

(73) Assignee: VANOCUR REFRACTORIES LLC, Tonawanda, NY (US)

( * ) Notice: Subject to any disclaimer, the term of this patent is extended or adjusted under 35 U.S.C. 154(b) by 0 days.

(21) Appl. No.: 18/701,468

(22) PCT Filed: Oct. 13, 2022

(86) PCT No.: PCT/US2022/078038
§ 371 (c)(1),
(2) Date: Apr. 15, 2024

(87) PCT Pub. No.: WO2023/064851
PCT Pub. Date: Apr. 20, 2023

(65) Prior Publication Data
US 2024/0400903 A1 Dec. 5, 2024

Related U.S. Application Data

(60) Provisional application No. 63/262,565, filed on Oct. 15, 2021, provisional application No. 63/262,566, filed on Oct. 15, 2021.

(51) Int. Cl.
C10B 29/02 (2006.01)
F27D 1/04 (2006.01)
(Continued)

(52) U.S. Cl.
CPC ............... *C10B 29/02* (2013.01); *F27D 1/04* (2013.01); *C10B 5/02* (2013.01); *C10B 5/06* (2013.01)

(58) Field of Classification Search
CPC .. C10B 5/02; C10B 5/06; C10B 29/02; F27D 1/04
See application file for complete search history.

(56) References Cited

U.S. PATENT DOCUMENTS 1,528,808 A 3/1925 Wilputte
1,739,929 A 12/1929 Underwood et al.
(Continued)

FOREIGN PATENT DOCUMENTS

EP 0116178 A2 8/1984
GB 155 316 A 12/1920
JP 2016 222758 A 12/2016

OTHER PUBLICATIONS

Extended European Search Report dated Jan. 21, 2025 for EP Application No. 22882011.4.

Primary Examiner — Jonathan Miller
(74) Attorney, Agent, or Firm — Simpson & Simpson, PLLC

(57) ABSTRACT

A corbel for a coke oven, including a gunblock section having a longitudinal through-bore arranged therein, the gunblock section having at least one substantially vertical though-bore in communication with the longitudinal through-bore. The gunblock section may be integral with a base. The gunblock section may also include a substantially vertical-angular channel open to a first end of the gunblock section and also open to a first side of the gunblock section.

13 Claims, 12 Drawing Sheets

(51) Int. Cl.
    *C10B 5/02*             (2006.01)
    *C10B 5/06*             (2006.01)

(56) References Cited

U.S. PATENT DOCUMENTS

| | | |
|---|---|---|
| 1,754,131 A | 4/1930 | Van Ackeren |
| 1,775,494 A | 9/1930 | Klockman |
| 2,132,522 A | 10/1938 | Van Ackeren |
| 2,294,005 A | 8/1942 | Taylor et al. |
| 4,069,633 A * | 1/1978 | Cooper .................... E04B 2/08 |
| | | 266/283 |
| 4,364,798 A * | 12/1982 | Costa ...................... C10B 29/06 |
| | | 264/30 |
| 4,565,605 A * | 1/1986 | Kruse ...................... C10B 29/02 |
| | | 202/139 |
| 5,061,527 A | 10/1991 | Watanabe et al. |
| 5,137,603 A * | 8/1992 | Arthur, Jr. ............... C10B 29/02 |
| | | 202/139 |
| 5,676,540 A * | 10/1997 | Williams .................. F27D 1/04 |
| | | 432/247 |
| 7,827,689 B2 | 11/2010 | Crane et al. |
| 8,266,853 B2 * | 9/2012 | Bloom ..................... C10B 29/06 |
| | | 52/505 |
| 8,640,635 B2 * | 2/2014 | Bloom ..................... C10B 5/12 |
| | | 52/505 |
| 2010/0287871 A1 | 11/2010 | Bloom et al. |
| 2016/0264870 A1 | 9/2016 | Bowser, Jr. |
| 2016/0281983 A1 | 9/2016 | Bowser, Jr. |

* cited by examiner

CORBEL FOR A COKE OVEN OR COKE OVEN BATTERY

CROSS-REFERENCE TO RELATED APPLICATIONS

This application claims the benefit under Articles 4 and 8 of the Stockholm Act of the Paris Convention for the Protection of Industrial Property of U.S. Provisional Patent Application No. 63/262,565, filed on Oct. 15, 2021, and U.S. Provisional Patent Application No. 63/262,566, filed on Oct. 15, 2021, which applications are hereby incorporated by reference herein in their entireties.

FIELD

The present invention relates to coke ovens, and, more particularly, to a corbel for a coke oven. More specifically, the present invention relations to gunblock configurations for a corbel for a coke oven or coke coven battery.

BACKGROUND

Coke is typically produced by heating coal in a coke oven battery. This battery may have anywhere from 40 to over 100 side-by-side coking chambers or ovens separated from each other by heating walls. Gas is burned within the walls to heat the coal arranged in the ovens. The floor bricks of each oven rest upon corbels. A regenerator is located in an area below the corbels. The regenerator is filled with bricks that have a relatively large amount of surface area per volume, generally due to slots formed in the bricks. In the regenerator, exhaust waste heat is used to pre-heat incoming air as well as cool the exhaust waste heat prior to discharge. The slotted bricks are called checker bricks, and they facilitate the heat transfer from the exhaust waste heat to the combustion materials. The regenerator supports the corbels. In turn, the corbels support the coke oven floor bricks and the heating walls. The heating walls, floor bricks, and corbels have traditionally been made of silica brick.

However, current corbel designs are susceptible to leakage since current corbels are made of multiple blocks or modules. Specifically, the modules must be mortared together, which is time consuming and allows for undesirably large thermal expansion. The thermal expansion of the components leads to permanent gaps that allow the leakage of gas. Because of the large number of bricks traditionally used, there are hundreds, and sometimes thousands, of potential failure points in corbels constructed using the conventional techniques and bricks.

Moreover, current corbel designs do not allow for optimal air flow between the heating wall, specifically the flue, and the regenerator. Furthermore, current corbel designs are very difficult and time consuming to replace, and require a shut down in coke processing. The corbel component of the coke oven, specifically a gun-flue, or gun-fire, type coke oven. In gun-fire type ovens, the corbel usually houses a horizontal gas duct extending the length of the individual coke oven—this is known as the "gunblock". The gunblock is typically a separate component which is then surrounded by a plurality of multiple blocks or modules which collectively form the corbel of a coke oven.

Thus, there is a long felt need for a corbel for a coke oven that improves air and gas flow between the flue and the regenerator, and facilitates easy replacement.

There is also a long felt need for a corbel for a coke oven having a gunblock section therein—eliminating multiple seams created by a plurality of blocks or modules secured around a typical corbel gunblock.

There is an additional long felt need for a corbel for a coke oven having a plurality of gunblock configurations in order to accommodate different coke oven repair or construction requirements while eliminating the need for excess blocks or modules.

There is a further long felt need for a corbel configuration having an integral gunblock, i.e., a gunblock section, thereby eliminating the need for excess blocks, or modules, to fully construct a corbel—decreasing construction, and/or repair, downtime.

SUMMARY

At the outset, the present invention is generally related to corbel blocks having a plurality of gunblock configurations, where each of the configurations include at least one substantially vertical through-bore in communication with a longitudinal through-bore located within a gunblock section of the corbel block. Each of the possible configurations of the present invention may include a plurality of components extending from and integral with the gunblock section, such as, a base, at least one shoulder, at least one ledge, at least one flue channel, or a combination thereof—allowing a plurality of different arrangements to be utilized for repair, or construction, of a coke oven or coke oven battery.

In some embodiments, the present invention generally comprises a corbel for a coke oven having a base, a gunblock section integral with the base, the gunblock section having a longitudinal through-bore extending from a first end to a second end, at least one substantially vertical through-bore arranged within the gunblock section, the at least one substantially vertical through-bore in communication with the longitudinal through-bore, and a pair of shoulders extending from the base, each of the pair of shoulders having a groove arranged therein.

In other embodiments, the present invention could also generally comprise a corbel for a coke oven having a base, the base having a first side and a second side, a gunblock section integral with the base, the gunblock section having a longitudinal through-bore extending from a first end to a second end, at least one substantially vertical through-bore arranged within the gunblock section, the at least one substantially vertical through-bore in communication with the longitudinal through-bore, and a substantially vertically-angular channel proximate the first end of the gunblock section and having an opening arranged within a group consisting of: the first side of the base and the second side of the base.

In further embodiments, the present invention could further generally comprise a corbel for a coke oven having a gunblock section, the gunblock section having a longitudinal through-bore extending from a first end to a second end, the gunblock section having a first side and a second side extending therefrom, at least one substantially vertical through-bore arranged within the gunblock section, the at least one substantially vertical through-bore in communication with the longitudinal through-bore, and a substantially vertically-angular channel proximate the first end of the gunblock section, the substantially vertically-angular channel having an opening arranged within a group consisting of: the first side; and, the second side.

In additional embodiments, the present invention may generally comprise a corbel for a coke oven, where the corbel comprises a gunblock section having a first end and a second end, the gunblock section having a longitudinal through-bore extending from the first end to the second end, the gunblock section having at least one substantially vertical through-bore therein, the at least one substantially vertical through-bore in communication with the longitudinal through-bore, the gunblock section further including at least one arrangement extending therefrom, the arrangement selected from a group consisting of: a base, the base having a first side and a second side extending therefrom, the first side having a shoulder arranged thereon, the second side having a shoulder arranged thereon; a base, the base having a first side and a second side extending therefrom, a substantially vertically-angular channel proximate the first end of the gunblock section, the substantially vertically-angular channel having an opening arranged within a group consisting of: the first side of the base; and, the second side of said base; and, a first side and a second side extending from the gunblock section, a substantially vertically-angular channel proximate the first end of the gunblock section, the substantially vertically-angular channel having an opening arranged within a group consisting of: the first side; and, the second side.

In even further embodiments, the present invention may provide a corbel for a coke oven, comprising a top surface including a first cavity and a second cavity, a bottom surface including a first protrusion extending therefrom, a front surface including a passageway formed therein, a rear surface, a first side surface, a second side surface, and a through-bore extending from the front surface to the rear surface, the through-bore in fluid communication with the first cavity and the second cavity.

In some still further embodiments, the second cavity is spaced apart from the first cavity. In some embodiments, at least one of the first cavity and the second cavity is arranged between and spaced apart from the first side surface and the second side surface. In some embodiments, the through-bore is arranged at least partially on the first protrusion. In some embodiments, the through-bore extends partially above the bottom surface and partially below the bottom surface. In some embodiments, at least one of the first cavity and the second cavity comprises a hole extending to the through-bore. In some embodiments, the front surface comprises a recess arranged around the through-bore, and the rear surface comprises a second protrusion arranged around the through-bore. In some embodiments, the passageway comprises a first end arranged at the first cavity, a second end arranged proximate the bottom surface, a first wall extending from the first end to the second end, and a second wall extending from the first end to the second end. In some embodiments, the first wall and the second wall form a width of the passageway, and the width increases from the first end to the second end. In some embodiments, at least one of the first wall and the second wall comprises a curvilinear portion extending from the first cavity, and a linear portion extending from the curvilinear portion to the second side surface. In some embodiments, at least one of the first side surface and the second side surface comprises a second protrusion extending therefrom in a first direction, the second protrusion spaced apart from the top surface in a second direction, the second direction perpendicular to the first direction, and a third protrusion extending from the second protrusion in the first direction. In some embodiments, the third protrusion comprises a first surface perpendicular to the bottom surface, and a second surface tapered from the first surface to the bottom surface.

In other additional embodiments, the present invention may provide for a corbel for a coke oven, comprising a first side surface, a second side surface, a top surface including a first cavity and a second cavity, a bottom surface including a first protrusion extending therefrom, a front surface including a passageway formed therein, the passageway extending along a curvilinear path from the first cavity to the second side surface, a rear surface, and a through-bore extending from the front surface to the rear surface, the through-bore in fluid communication with at least one of the first cavity and the second cavity.

In even further additional embodiments, the second cavity is spaced apart from the first cavity. In some embodiments, the through-bore is arranged at least partially on the first protrusion. In some embodiments, at least one of the first cavity and the second cavity comprises a hole extending to the through-bore. In some embodiments, the passageway comprises a first end arranged at the first cavity, a second end arranged proximate the bottom surface, a first wall extending from the first end to the second end, and a second wall extending from the first end to the second end. In some embodiments, the first wall and the second wall form a width of the passageway, and the width increases from the first end to the second end. In some embodiments, at least one of the first side surface and the second side surface comprises a second protrusion extending therefrom in a first direction, the second protrusion spaced apart from the top surface in a second direction, the second direction perpendicular to the first direction, and a third protrusion extending from the second protrusion in the first direction.

In further and additional embodiments, the present invention may provide for a coke oven battery, comprising a regenerator including a regenerator region formed between a plurality of pillars, a corbel arranged on at least one pillar of the plurality of pillars, the corbel including a top surface including a first cavity and a second cavity, a bottom surface including a first protrusion extending therefrom and engaged with the at least one pillar, a front surface including a passageway formed therein, a rear surface, a first side surface, a second side surface, and a through-bore extending from the front surface to the rear surface, the through-bore in fluid communication with the first cavity and the second cavity, a heating wall arranged at least partially on the top surface, the heating wall comprising at least one flue in fluid communication with at least one of the first cavity, the second cavity, and the passageway, and a floor engaged with at least one of the first side surface and the second side surface.

The object of the present invention is to generally provide for a corbel having an integrally-arranged gunblock section, where a plurality of components extend therefrom, allowing the present invention to be used in the construction and/or repair of coke oven batteries, such that the present invention eliminates the need for additional blocks, bricks, and/or modules, thereby creating: 1. fewer seams to prevent possible leaks; 2. utilization of fewer components during construction and/or repair by combining the traditionally-used blocks, modules, and/or bricks into an integral corbel having a plurality of configurations; and, 3. more efficient construction and/or repair by eliminating the need for the additional components in the assembly of a coke oven and/or coke oven battery.

These and other objects, features, and advantages of the present invention will become readily apparent upon a review of the following detailed description of the invention, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
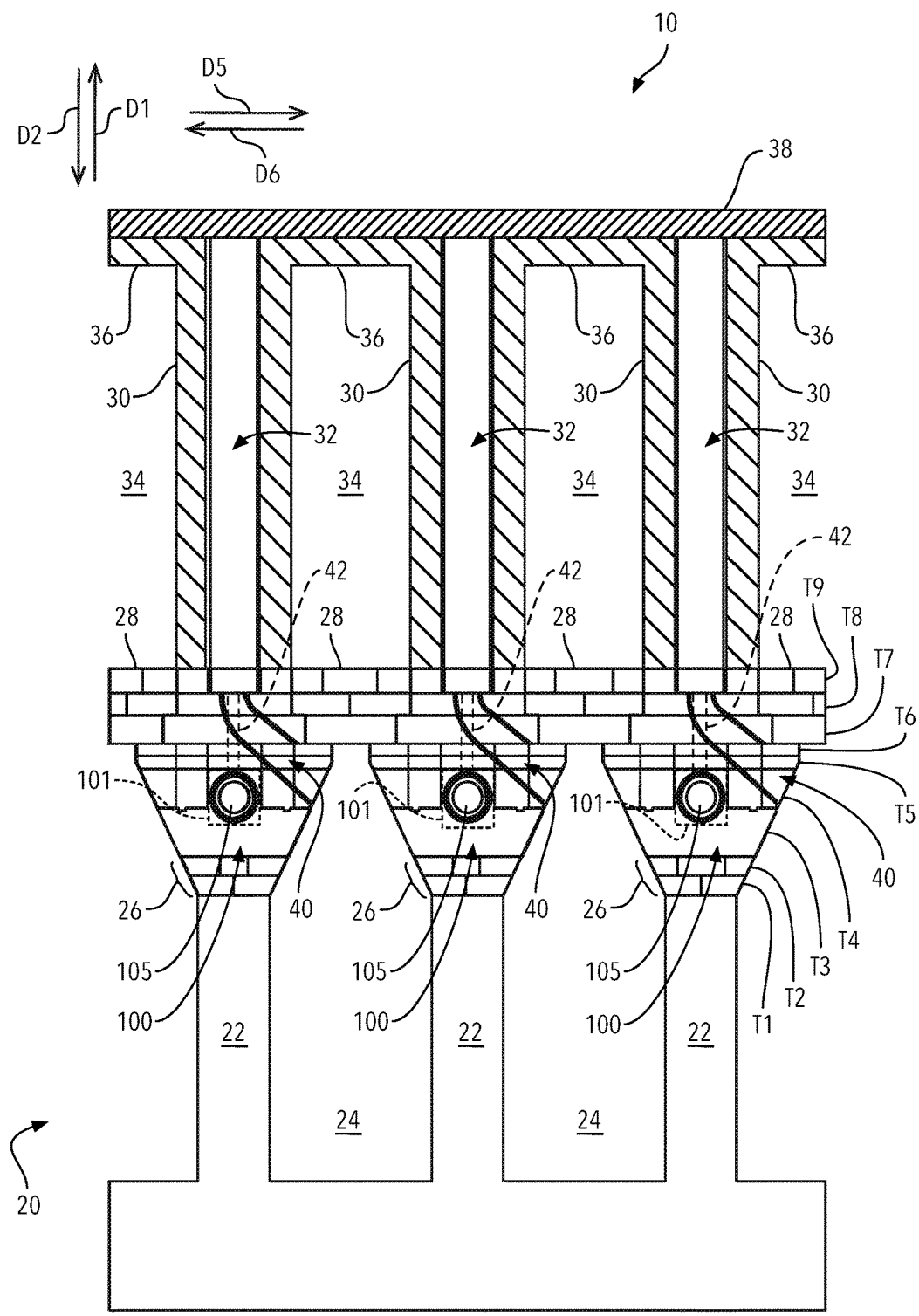
FIG. 1 is an exemplary cross-sectional view of a coke oven battery in accordance with a first embodiment of the present invention.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

It should be noted that the term "channel" (used in accordance with the components indicated by reference numerals 40, 250, and 350) is substantially the same as the phrase "vertically-angular channel". As such, the terms may be interchangeably used. However, it should also be noted that the component indicated by the reference numeral 40 is not a component of the present invention, whereas components indicated by the reference numerals 250 and 350 are components of the present invention.

It should also be noted that the term "vertical throughbore" is used in accordance with the components indicated by reference numerals 42, 110, 110A, 110B, 210A, 210B, 310A, and 310B. However, it should be further noted that the component indicated by reference numeral 42 is not a component of the present invention, whereas the components indicated by reference numerals 110, 110A, 110B, 210A, 210B, 310A, and 310B are components of the present invention.

Coke Oven Battery

Referring now to the figures, the following description should be taken in view of FIGS. 1-2, 4-5 and 7-8, as these illustrations generally illustrate a cross-sectional view of a coke oven battery and a partial perspective of the same, respectively. Specifically, FIGS. 1 and 2 generally illustrate a coke oven battery having the first embodiment of the present invention therein (corbel 100), where FIGS. 4 and 5 generally illustrate a coke oven battery having the second embodiment of the present invention therein (corbel 200), and FIGS. 7 and 8 generally illustrate a coke oven battery having the third embodiment of the present invention therein (corbel 300). The aforementioned illustrations generally depict the same components of a coke oven battery less structural differences provided by the alternative structural configurations of the various embodiments of the present invention. It should be noted that these illustrations of coke oven battery 10 are merely exemplary and one having ordinary skill in the art would understand that FIGS. 1-2, 4-5 and 7-8 are merely representative to illustrate the structural benefits of utilizing corbels 100, 200, and 300 therein.

Figure 4:
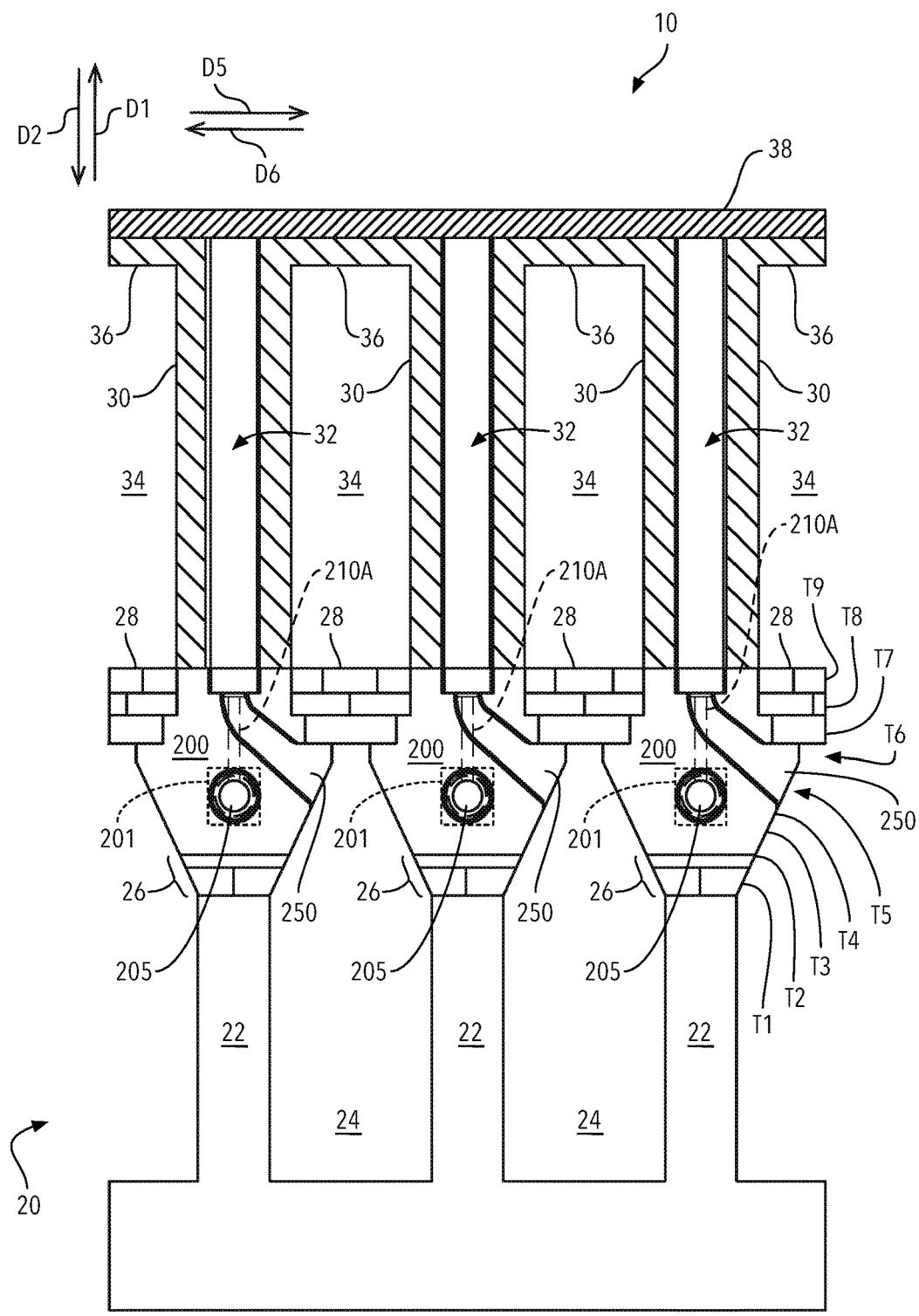
FIG. 4 is an exemplary cross-sectional view of a coke oven battery in accordance with a second embodiment of the present invention.
Figure 7:
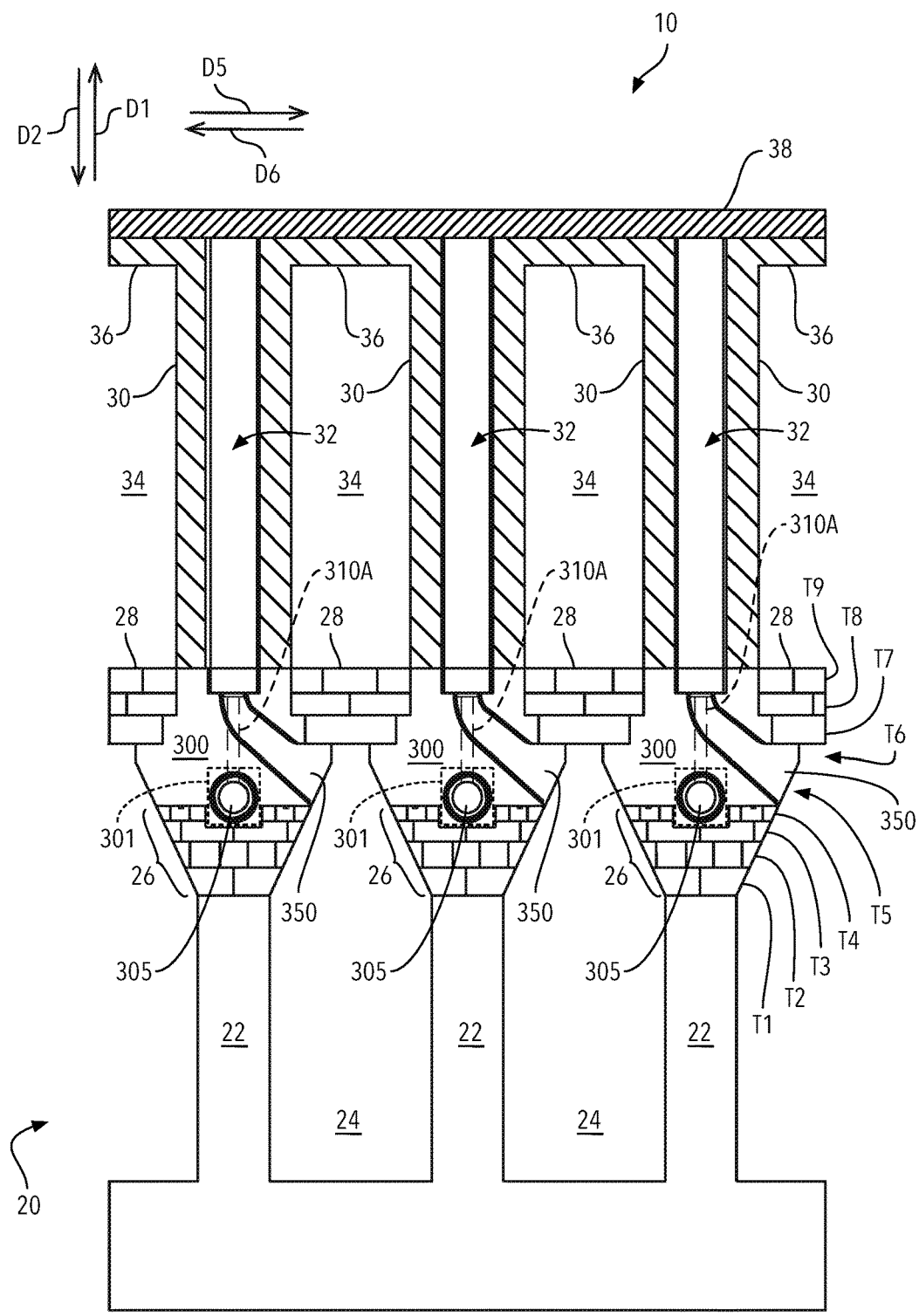
FIG. 7 is an exemplary cross-sectional view of a coke oven battery in accordance with a third embodiment of the present invention.
Figure 8:
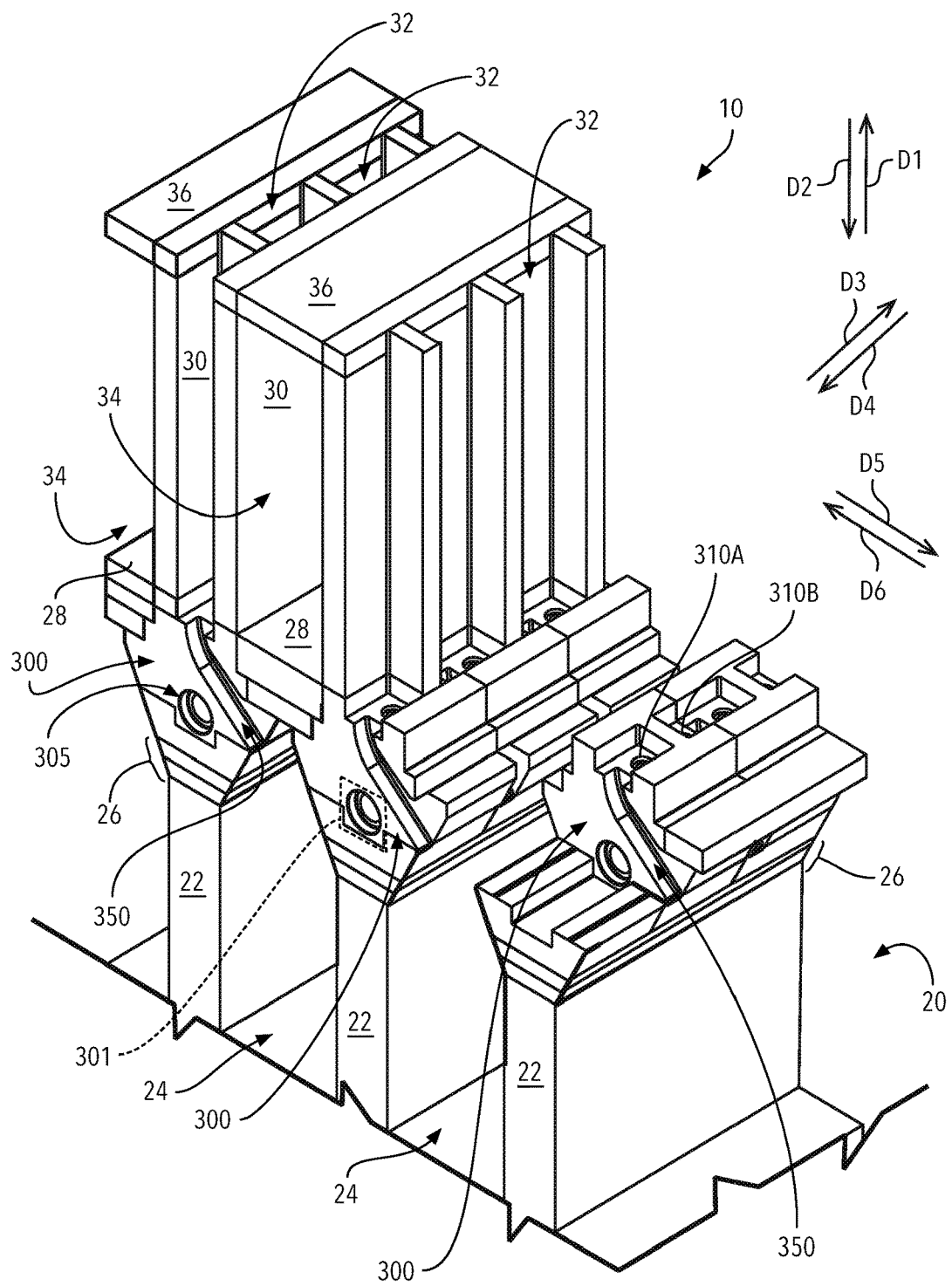
FIG. 8 is a partial perspective view of the coke oven battery shown in FIG. 7.

FIGS. 1, 4, and 7 are cross-sectional views of coke oven battery 10, in accordance with corbels 100, 200, and 300, respectively. Coke oven battery 10 generally comprises regenerator 20 and one or more ovens 34.

Regenerator 20 comprises a plurality of piers or pillars 22, which are spaced apart to form regenerator regions 24. In some embodiments, each of pillars 22 comprise a plurality of bricks, modules, and/or blocks. Foundations 26 sit atop pillars 22. Foundations 26 generally support corbels 100, 200, and 300—either directly, or indirectly. Typically, foundation 26 comprises a plurality of bricks, modules, and/or blocks, i.e., a variety of structural components. In some embodiments, foundation 26 comprises a plurality of blocks arranged in a plurality of tiers, for example, two tiers T1 and T2 as shown in FIGS. 1 and 4, or four tiers T1-4 as shown in FIG. 7.

Figure 2:
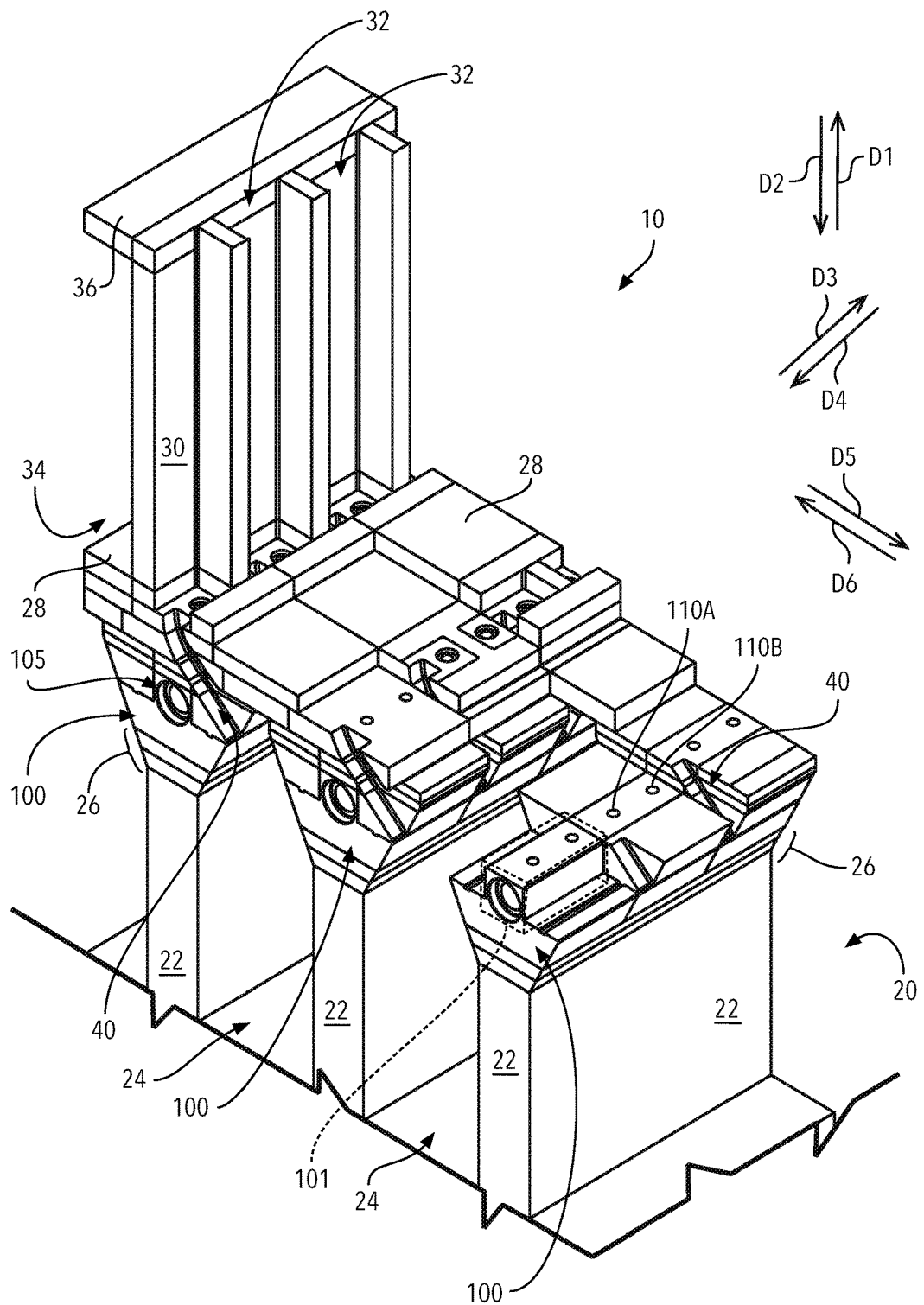
FIG. 2 is a partial perspective view of the coke oven battery shown in FIG. 1.
Figure 3A:
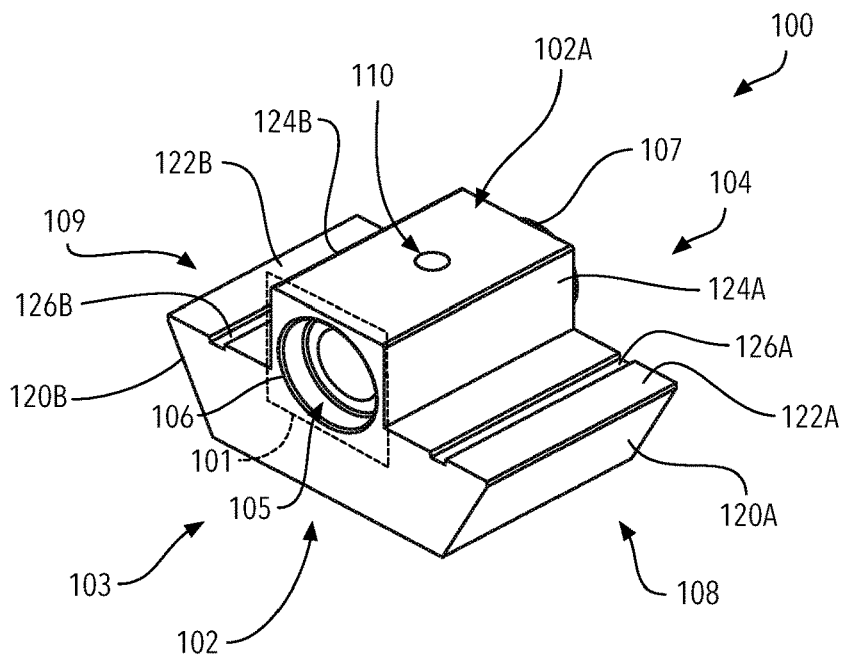
FIG. 3A is a perspective view of a first embodiment of a corbel shown in FIG. 1.
Figure 3B:
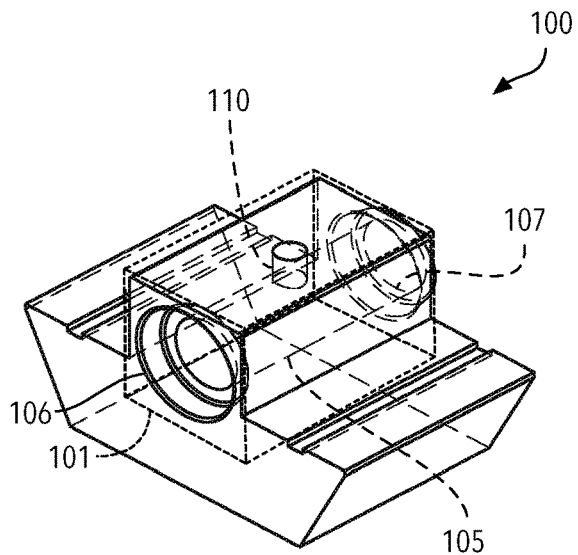
FIG. 3B is a skeleton perspective view of the corbel shown in FIG. 3A.
Figure 3C:
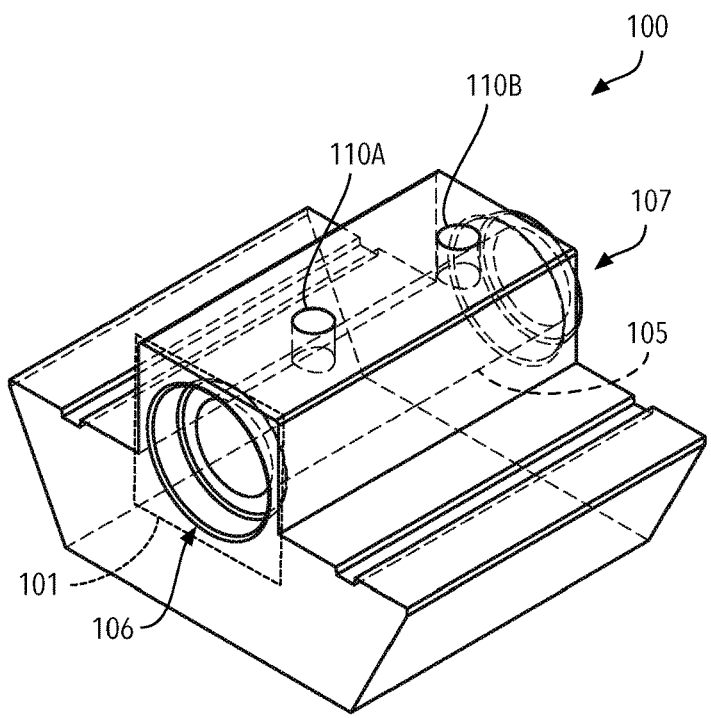
FIG. 3C is a perspective view of an alternative embodiment of the corbel shown in FIGS. 3A and 3B.

Corbels 100, 200, and 300 are arranged on top of pillars 22 and support the oven section of coke oven battery 10. Specifically, corbels 100, 200, and 300 support floor 28, heating walls 30, and coal placed in ovens 34, allowing air to flow between flues 32 and regenerator 20, and also allowing gas to be injected into flues 32. For example, gas is injected into corbels 100, 200, and 300 horizontally via horizontal through-bores 105, 205, and 305 of gunblock sections 101, 102, and 103, respectively, and flows vertically through vertical through-bores 110 and 42 (of corbel 100, where vertical through-bore 42 is not a component of corbel 100 but is in fluid communication with vertical through-bore 110), 210A and 210B (of corbel 200), 310A and 310B (of corbel 300) into flues 32. As discussed herein, corbel 100 may have a pair of vertical through-bores, 110A and 110B (as shown in FIGS. 2 and 3C), which are in fluid communication with vertical through-bores 42 of coke oven battery 10 (shown in FIG. 2). Air flows up through channels 40, channels 250 (of corbel 200) and/or 350 (of corbel 300) and into flues 32 where it mixes with the fuel and combusts to heat heating walls 30, thus cooking the coal arranged in ovens 34 transforming it into coke. Exhaust gasses are created from such combustion, these hot exhaust gases may flow down through channels 40 (of coke oven battery 10 when corbel 100 is used therein), 250 (of corbel 200) and 350 (of corbel 300) and into regenerator regions 24, thereby preheating the incoming gas and/or air. Preheating gas and/or air as it flows into flues prior to combustion is desirable because it produces more efficient vaporization and higher combustion efficiency than cold fuel. It should be appreciated and understand by those having ordinary skill in the art that in some arrangements, coke oven battery 10 further comprises shut-off means (not illustrated) operatively arranged to selectively shut off the gas flow through one or more of the vertical through-bores. Since through-bores 110 (of corbel 100), through-bores 110A and 110B (of an alternatively configured corbel 100), 210A and 210B (of corbel 200), 310A and 310B (of corbel 300) are preferably associated with different flues 32, such shut-off means (e.g., valves) allow the operator to control the temperature in each flue 32 and thus ovens 34. Corbels 100, 200, and 300 will be described in greater detail, infra.

Floor 28 is arranged on and/or engaged with corbels 100, 200, and 300 (either directly or indirectly). Floor 28 is operatively arranged to support the coal in ovens 34. In some embodiments, floor 28 comprises a plurality of blocks. Floor 28 may comprise a plurality of blocks arranged in a plurality of tiers, for example, six tiers T4-9 in FIG. 1, or three tiers T7-9 in FIGS. 4 and 7. Heating walls 30 are arranged on corbels 100, 200, and 300 and/or floor 28 and comprise flues 32 arranged therein. Flues 32 are in fluid communication with through-bores 110 (of corbel 100 via vertical through-bore 42), 210A and 210B (of corbel 200), 310A and 310B (of corbel 300), and channels 40, 250, and 350. Oven ceiling or ceilings 36 are arranged proximate the, or on, top of heating walls 30. Thus, coking ovens 34 are formed by floor 28, heating walls 30, and oven ceiling 36. Battery top 38 is arranged on top of heating walls 30 and may enclose flues 32. In some embodiments, each flue 32 is in fluid communication with one channel (40, 250 and/or 350) and at least one vertical through-bore, for example, vertical through-bores 42, 210A, and/or 310A. In some embodiments, and as shown in FIGS. 4 and 7, each flue 32 is in fluid communication with vertical through-bores 210A or 310A, vertical through-bores 210B or 310B (of an adjacently arranged corbel), and one channel (250 or 350). Specifically, one flue 32 is aligned with, in order in direction D3, vertical through-bore 210B (or 310B)—of a first corbel, channel 250 (or 350)—of a second corbel arranged adjacently to the first corbel, and vertical through-bore 210A (or 310A)—of the second corbel. As discussed supra and shown in FIG. 2, it should be appreciated that corbel 100 may be alternatively arranged with to two (2) vertical through-bores and confine to the aforementioned arrangement-less the inclusion of a channel within corbel 100, i.e., channel 40 is not a component of corbel 100 as shown in FIGS. 1 and 2.

The arrangement of having a gas injection hole on either side of an air injection passageway provides a desirable combustion mixture of air and fuel. In some configurations, as shown in FIGS. 4 and 7, heating walls 30 may be arranged solely on top of corbels 200 and 300, namely, on a top surface. In some embodiments, heating walls 30 may be arranged at least partially on corbels 200 and 300 and at least partially on floor 28. In some embodiments, heating walls 30 may be arranged solely on floor 28.

Corbel: First Embodiment

The follow description pertains to the first embodiment of the present invention and should be taken in view of FIGS. 1-3D, which illustrate a cross-sectional view of a coke oven battery in accordance with corbel 100, a partial perspective view of the same, a front perspective view, a skeleton perspective view, an alternative embodiment of corbel 100, and a top view of corbel 100 and an adjacent corbel 100, respectively.

Corbel 100 generally comprises gunblock section 101, base 102, top end 102A, first end 103, second end 104, through-bore 105 having first opening 106 and second opening 107, first side 108, second side 109, vertical through-bore 110. Gunblock section 101 includes the horizontal gas line, through-bore 105, defined by first opening 106 arranged within first end 103 and second opening 107 arranged within second end 104. Vertical through-bore 110 is in fluid communication with through-bore 105 and has an opening arranged within top end 102A.

First side 108 is defined by tapered portion 120A which extends from base 102. Tapered portion 120A terminates at shoulder 122A. Extending from shoulder 122A is first side 124A of gunblock section 101. Groove 126A is disposed within shoulder 122A is arranged to extend from first end 103 to second end 104.

Second side 109 is defined by tapered portion 120B which extends from base 102. Tapered portion 120B terminates at shoulder 122B. Extending from shoulder 122B is first side 124B of gunblock section 101. Groove 126B is disposed within shoulder 122B and is arranged to extend from first end 103 to second end 104.

In an alternative embodiment of corbel 100, illustrated in FIG. 3C, corbel 100 may have first vertical through-bore 110A and second vertical through-bore 110B, where each of through-bores 110A and 110B having openings arranged within top end 102A and are both in fluid communication with through-bore 105.

Figure 3D:
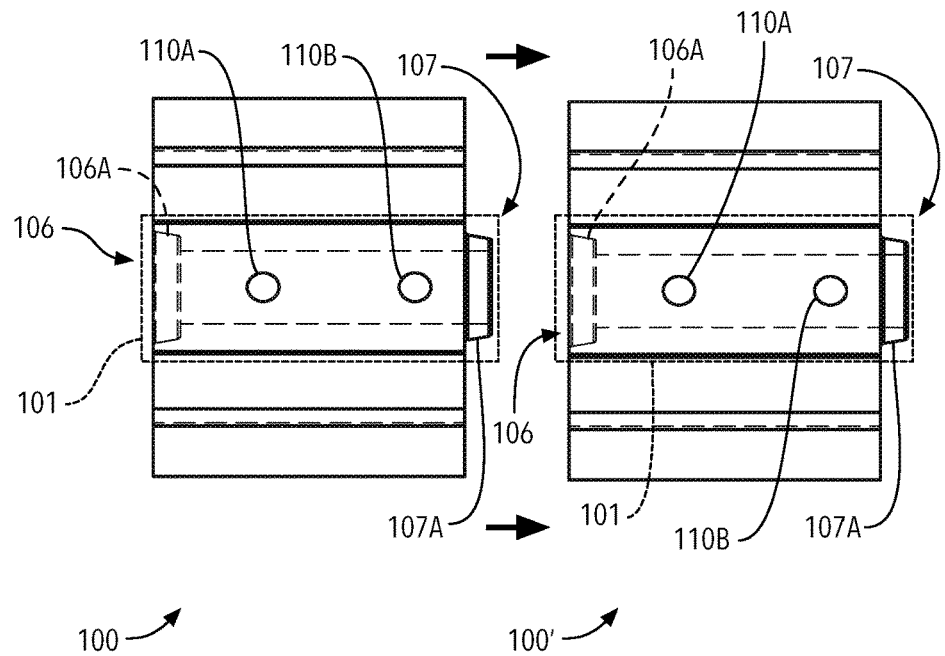
FIG. 3D is a top plan view of two corbels shown in FIG. 3C.
Figure 9A:
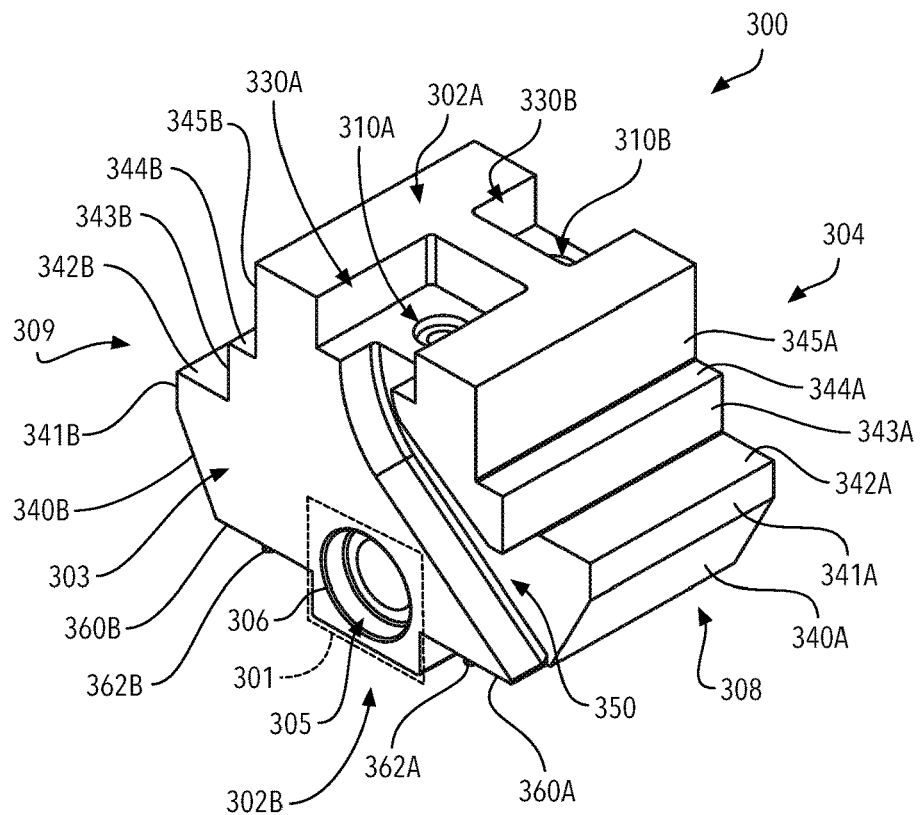
FIG. 9A is a perspective view of a third embodiment of a corbel shown in FIG. 7; and, FIG. 9B is a skeleton perspective view of the corbel shown in FIG. 9A.
Figure 9B:
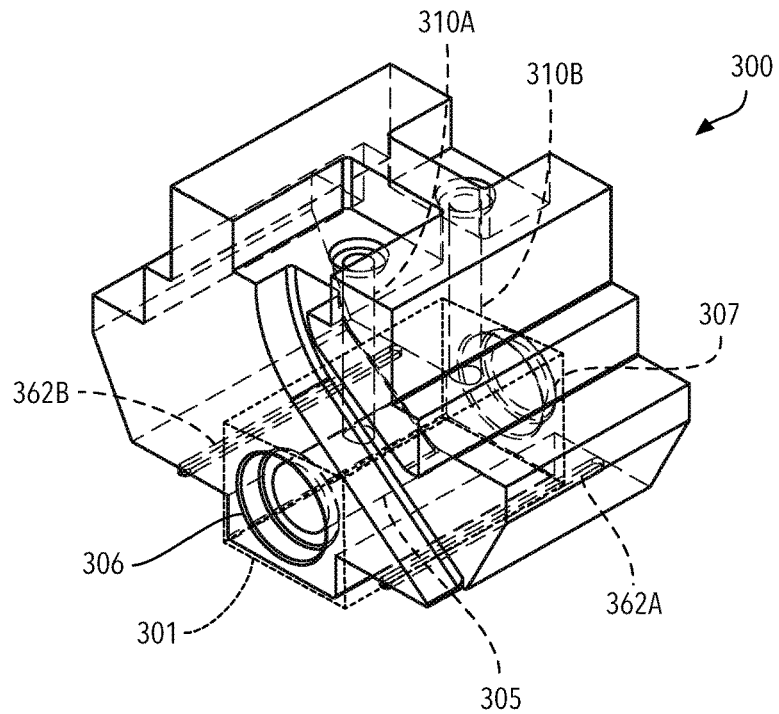

In some embodiments, through-bore 105 includes recess 106A and lip 107A, where recess 106A is disposed proximate first opening 106 and lip 107A extends from second opening 107. As generally illustrated in FIG. 3D, lip 107A of corbel 100 is arranged to be seated within recess 106A of adjacent corbel 100'—creating a more efficient seal of through-bore 105 of corbel 100 and through-bore 105 of adjacent corbel 100', thereby preventing and/or limiting gas leakage therebetween. It should be appreciated that the above-described arrangements of through-bore 105 of corbel 100 and through-bore 105 of adjacent corbel 100' may also apply to corbels 200 and 300 (shown in FIG. 9A)—thereby preventing and/or limiting gas leakage therebetween.

It should be appreciated that an important aspect of corbel 100 is its configuration provides the tiers between foundation 26 and floor 28, specifically the tiers proximate foundation 26 (T3), as well as a portion of tier T4—as shown in FIGS. 1 and 2. Specifically, corbel 100 provides tier T3 and a portion of tier T4, in a single, integrally formed block. By providing a 30 portion of tier T4, and foundation 26 (which may be inclusive of tier T3), a stronger and easier connection between corbel 100 and foundation 26 is formed. In some embodiments, base 102 of corbel 100 could also include tiers T1 and T2, thereby eliminating the need for foundation 26, as shown in FIG. 1.

It should be further appreciated that grooves 126A and 126B provide mating locations for respective protrusions arranged on the lower surfaces of blocks (tier T4) placed on shoulders 122A and 122B, thereby preventing displacement of those blocks in directions D5 and D6, i.e., similar to a tongue and groove connection. In some embodiments, grooves 126A and 126B could have perpendicularly arranged portions extending therefrom, i.e., cross-shaped, further preventing displacement of blocks, arranged thereon, in directions D3-D6.

It should also be appreciated that tapered portions 120A and 120B of corbel 100, when arranged next to tapered portions 120A and 120b of an adjacent corbel 100, assists in direct air into channel 40 (i.e., air traveling in direction D1). It should also be appreciated that in some embodiments, corbel 100 may not comprise tapered portions 120A and 120B, whereas sides 108 and 109 are substantially planar surfaces which extend down to base 102.

Corbel: Second Embodiment

The following description pertains to the second embodiment of the present invention and should be taken in view of FIGS. 4-6F, which illustrate a cross-sectional view of a coke oven battery in accordance with corbel 200, a partial perspective view of the same, a front perspective view, a skeleton perspective view, a perspective view of an alternative embodiment of corbel 200, a skeleton perspective view of the alternative embodiment of corbel 200, a perspective view of two abutting corbels 200 having alternating channels, and a top plan view of two abutting corbels 200 having alternating channels, respectively.

Corbel 200 generally comprises gunblock section 201, base 202, top end 202A, first end 203, second end 204, through-bore 205 having first opening 206 and second opening 207, first side 208, second side 209, first vertical through-bore 210A, second vertical through-bore 210B, and channel 250. Gunblock section 201 includes the horizontal gas line, through-bore 205, defined by first opening 206 arranged within first end 203 and second opening 207 arranged within second end 204. First vertical through-bore 210A and second vertical through-bore 210B are in fluid communication with through-bore 205 and both have openings arranged within top end 202A. Specifically, the openings of first vertical through-bore 210A and second vertical through-bore 210B are located within recesses 230A and 230B arranged within top end 202A, respectively.

First side 208 is defined by tapered portion 240A which extends from base 202. Tapered portion 240A terminates at first planar end 241A. First planar end 241A terminates at first ledge 242A. Second planar end 243A extends from first ledge 242A. Second planar end 243A terminates at second ledge 244A. Third planar end 245A extends from second ledge 244A is. Third planar end 245A terminates at top end 202A.

Second side 209 is defined by tapered portion 240B which extends from base 202. Tapered portion 240B terminates at first planar end 241B. First planar end 241B terminates at first ledge 242B. Second planar end 243B extends from first ledge 242B. Second planar end 243B terminates at second ledge 244B. Third planar end 245B extends from second ledge 244B. Third planar end 245B terminates at top end 202A.

Figure 6A:
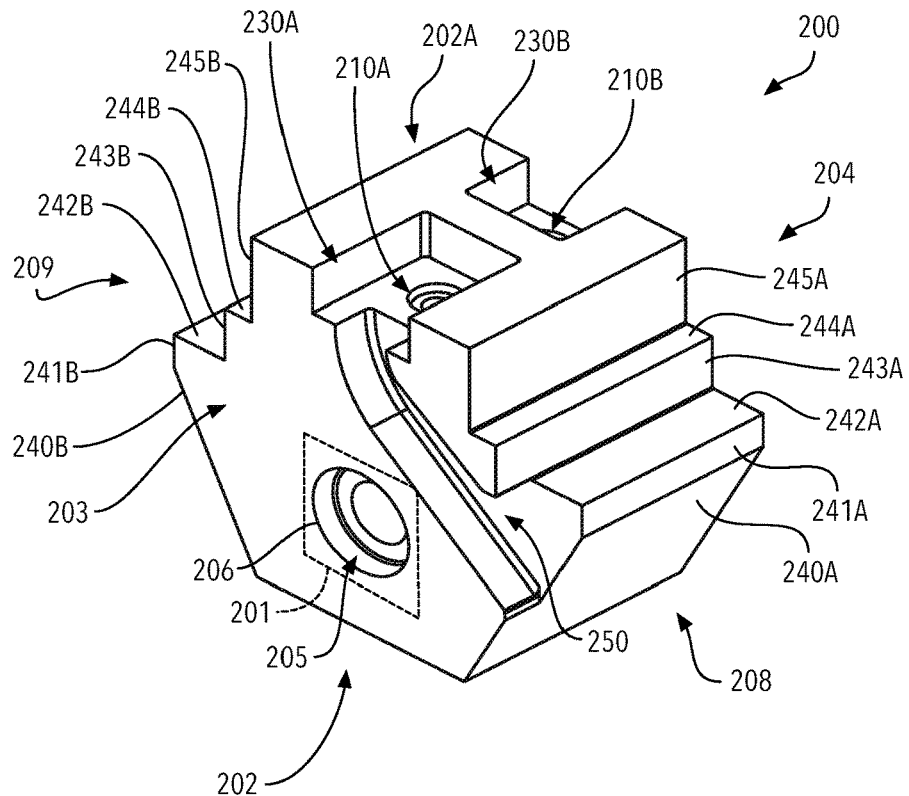
FIG. 6A is a perspective view of a second embodiment of a corbel shown in FIG. 4.
Figure 6B:
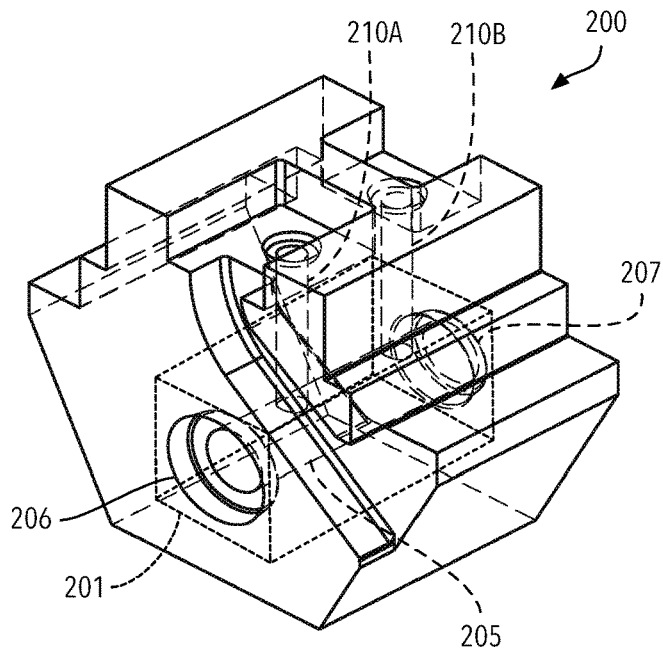
FIG. 6B is a skeleton perspective view of the corbel shown in FIG. 6A.
Figure 6C:
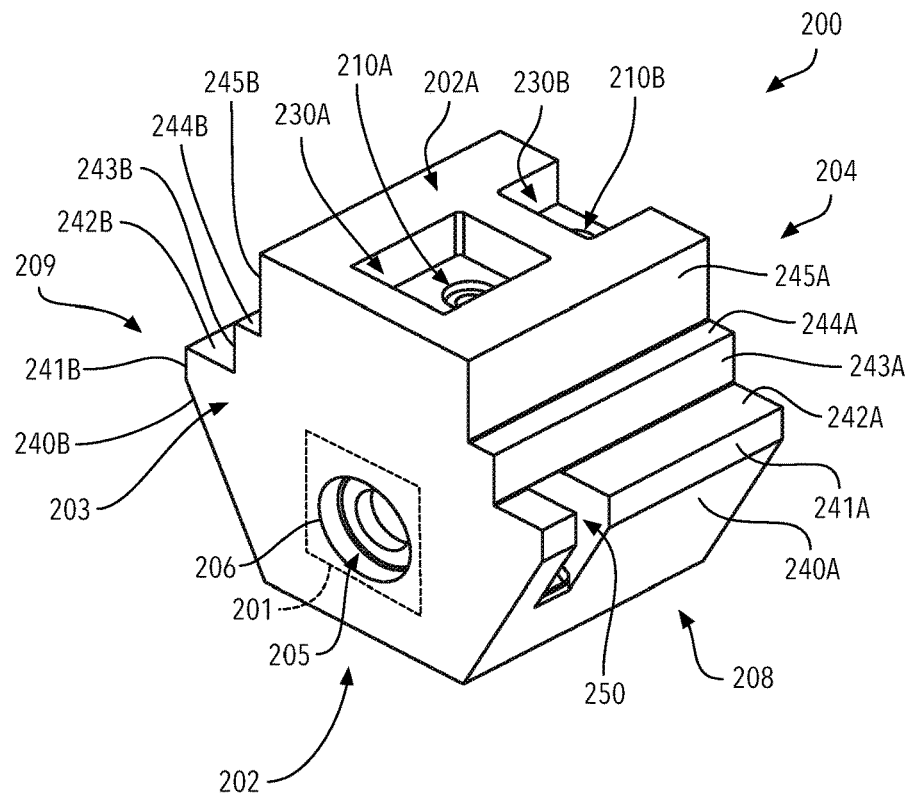
FIG. 6C is a perspective view of an alternative embodiment of the corbel shown in FIGS. 6A and 6B.
Figure 6D:
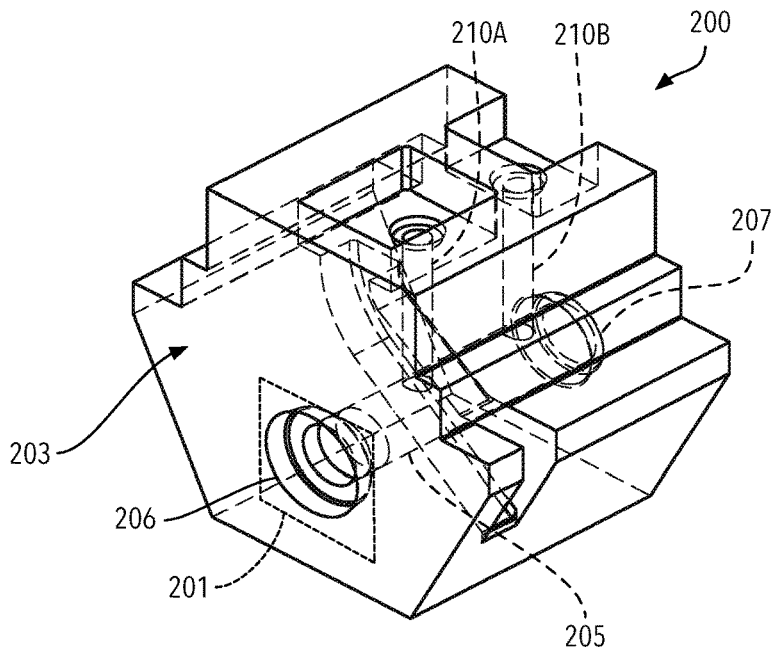
FIG. 6D is a skeleton perspective view of the corbel shown in FIG. 6C.
Figure 6E:
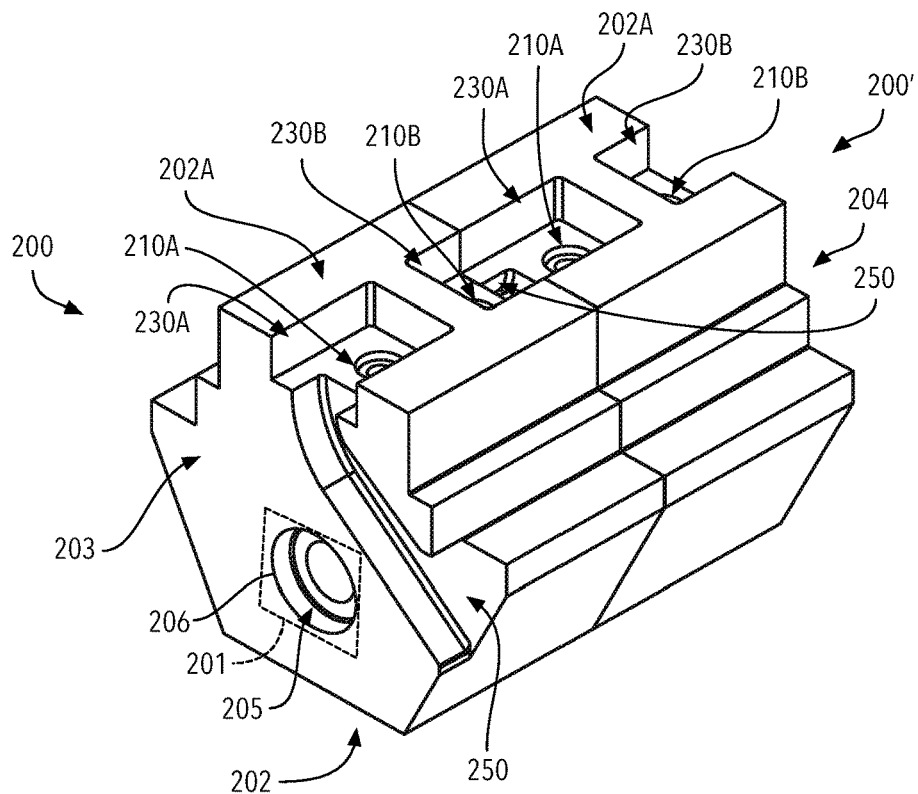
FIG. 6E is a perspective of two corbels shown in FIG. 6A having alternating channels.
Figure 6F:
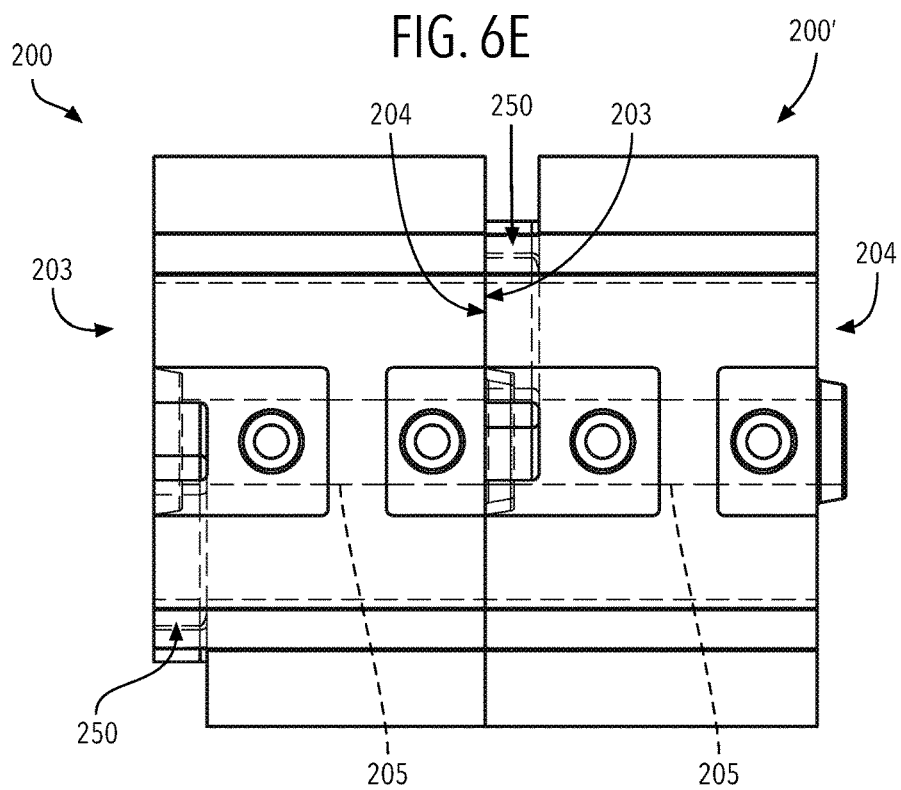
FIG. 6F is a top plan view of the two corbels shown in FIG. 6E.

Channel 250 is disposed within first end 203 of corbel 200, having an open portion on first end 203. Channel 250 has two ends, the first end is disposed within recess 230A and the second end is disposed within tapered portion 240A, first planar end 241A, and first ledge 242A of first side 208. It should be appreciated that channel 250 may alternatively be arranged to have its second end disposed within second side 209 (i.e., within tapered portion 240B, first planar end 241B, and first ledge 242B) of corbel 200—as illustrated in FIGS. 6E and 6F. It should be noted that the aforementioned configuration—alternatively arranged channels—may also apply to corbel 300. As generally illustrated in FIG. 6F, the open portion of channel 250 (arranged on first end 203) is arranged to be closed, covered, and/sealed, by second end 204 of adjacent corbel 200' that is abutting first end 203 of corbel 200 having channel 250 therein.

In some embodiments, channel 250 may not include an open portion disposed within first end 203. As shown in FIGS. 6C and 6D, channel 250 may be disposed within corbel 200. Corbel 200 may be utilized as an end corbel, or bookend, for a plurality of corbels that are abutted and formed together. The aforementioned configuration may also apply to corbel 300.

Figure 5:
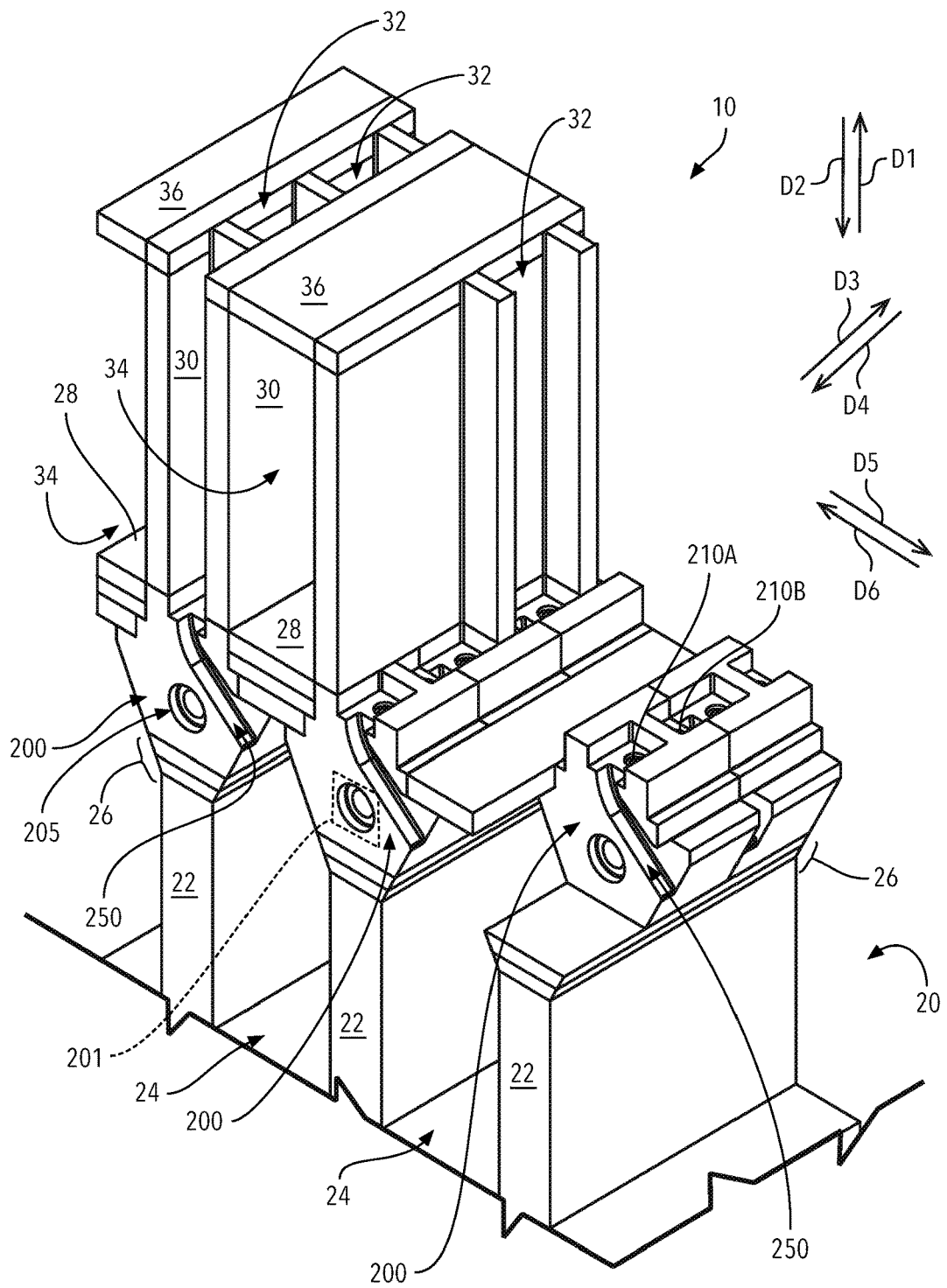
FIG. 5 is a partial perspective view of the coke oven battery shown in FIG. 4.

It should be appreciated that an important aspect of corbel 200 is its configuration provides the tiers between foundation 26 and floor 28, specifically the tiers proximate foundation 26 (T3 and T4), as well as the tiers proximate floor 28 (T5 and T6)—as shown in FIGS. 4 and 5. Specifically, corbel 200 provides tiers T3 through T6, in a single, integrally formed block providing a stronger and easier connection between corbel 200 and foundation 26, and eliminating seams created by individual blocks. Corbel 200 also provides for portions of tiers T7 through T9. In some embodiments, base 202 of corbel 200 could also include tiers T1 and T2, thereby eliminating the need for foundation 26, as shown in FIG. 4.

Tier T7 is arranged to be supported by first ledge 242A (and/or first ledge 242B). The respective block of tier T7 is specifically arranged to be placed on first ledge 242A (and/or first ledge 242B) and abut second planar end 243A (and/or second planar end 243B), where second planar end 243A prevents the block of tier T7 from moving in directions D5 or D6.

Floor 28, comprising tier T8 and/or T9, is arranged to be supported by second ledge 244A (and/or second ledge 244B). The respective block, or blocks, of floor 28, are specifically arranged to be placed on second ledge 244A (and/or second ledge 244B) and abut third planar end 245A (and/or third planar end 245B), where third planar end 245A prevents the respective block, or blocks of floor 28 (tier T8 and/or T9) from moving in direction D5 or D6.

The arrangement of corbel 200 provides for engagement and support of various tiers of floor 28 at different locations. This allows not only for increased support strength of floor 28, but also for easy repair of floor 28. For example, due to loading and unloading of coal/coke from ovens 34, over time floor 28 exhibits damage thereto. Typically, this damage occurs on the top layer of floor, namely, tier T9. The design of corbel 200 (i.e., the support of two or more layers of floor 28) allows for tier T9 to be easily removed and a new tier T9 placed, without having to remove any other tier of floor 28. Since the entirety of floor 28 does not need to be replaced, battery 10 down time and labor cost is saved.

Since corbel 200 generally comprises tiers T3 through T6 and portions of tiers T7 through T9, existing seams created by the plurality of blocks that once comprised these tiers are eliminated—thereby eliminating potential leak points of gas, and/or heat.

Corbel: Third Embodiment

The follow description pertains to the third embodiment of the present invention and should be taken in view of FIGS. 7-9B, which illustrate a cross-sectional view of a coke oven battery in accordance with corbel 300, a partial perspective view of the same, a front perspective view and a skeleton perspective view of corbel 300, respectively.

Corbel 300 generally comprises gunblock section 301, top end 302A, bottom end 302B, first end 303, second end 304, through-bore 305 having first opening 306 and second opening 307, first side 308, second side 309, first vertical through-bore 310A, second vertical through-bore 310B, and channel 350. Gunblock section 301 includes the horizontal gas line, through-bore 305, defined by first opening 306 arranged within first end 303 and second opening 307 arranged within second end 304. First vertical through-bore 310A and second vertical through-bore 310B are in fluid communication with through-bore 305 and both have openings arranged within top end 302A. Specifically, the openings of first vertical through-bore 310A and second vertical through-bore 310B located within recesses 330A and 330B arranged within top end 302A, respectively.

First side 308 is defined by tapered portion 340A which terminates at first planar end 341A. First planar end 341 terminates at first ledge 342A. Second planar end 343A extends from first ledge 342A. Second planar end 343A terminates at second ledge 344A. Third planar end 345A extends from second ledge 344A. Third planar end 345A terminates at top end 302A. First side 308 also includes base 360A arranged proximate to bottom end 302B. Protrusion 362A extends from base 360A and is further arranged to extend along base 360A from first end 303 to second end 304.

Second side 309 is defined by tapered portion 340B which terminates at first planar end 341B. First planar end 341B terminates at first ledge 342B. Second planar end 343B extends from first ledge 342B. Second planar end 343B terminates at second ledge 344B. Third planar end 345B extends from second ledge 344B. Third planar end 345B terminates at top end 302A. Second side 309 also includes base 360B arranged proximate to bottom end 302B. Protrusion 362B extends from base 360B and is further arranged to extend along base 360B from first end 303 to 20) second end 304.

Channel 350 is disposed within first end 303 of corbel 300, having an open portion on first end 303. Channel 350 has two ends, the first end is disposed within recess 330A and the second end is disposed within tapered portion 340A, first planar end 341A, and first ledge 342A of first side 308. It should be appreciated that channel 350 may alternatively be arranged to have its second end disposed within second side 309 (i.e., within tapered portion 340B, first planar end 341B, and first ledge 342B). The open portion of channel 350 is arranged to be closed and/or sealed by second end 304 of an adjacent corbel 300 that is abutting first end 303 of corbel 300 having channel 350 therein. Alternatively, channel 350 may be alternatively arranged within corbel 300 in a substantially similar arrangement of channel 250 of corbel 200 illustrated in FIG. 6E.

It should be noted that protrusions 362A and 362B are operatively arranged to engage recesses in foundation 26. The engagement between protrusions 362A and 362B and the recesses in foundation 26 help with alignment and securement of corbel 300 during installation. Protrusions 362A and 362B forms a portion of tier T4 and engages tier T4 of foundation 26, as shown in FIG. 7. The arrangement of protrusions 362A and 362B, extending from bases 360A and 360B and engaged with foundation 26, provides for added securement of corbel 300 to foundation 26. Protrusions 362A and 362B increase the surface area with which corbel 300 can be secured to foundation 26 and further eliminate shifting of corbel 300 in directions D5 and D6.

It should be appreciated that an important aspect of corbel 300 is that its configuration provides the intermediate tiers between foundation 26 and floor 28, as well as a portion of tier T4 and possible tier T3 (as shown in FIG. 7). Specifically, corbel 300 provides tiers T4-6 in a single, integrally formed block. By providing a portion of tier T4, namely, foundation 26, a stronger and easier connection between corbel 300 and foundation 26 is formed.

Tier T7 is arranged to be supported by first ledge 342A (and/or first ledge 342B). The respective block of tier T7 is specifically arranged to be placed on first ledge 342A (and/or first ledge 342B) and abut second planar end 343A (and/or second planar end 343B), where second planar end 343A prevents the block of tier T7 from moving in direction D5 or D6.

Floor 28, comprising tier T8 and/or T9, is arranged to be supported by second ledge 344A (and/or second ledge 344B). The respective block, or blocks, of floor 28, are specifically arranged to be placed on second ledge 344A (and/or second ledge 344B) and abut third planar end 345A (and/or third planar end 345B), where third planar end 345A prevents the respective block, or blocks of floor 28 (tier T8 and/or T9) from moving in direction D5 or D6.

The arrangement of corbel 300 provides for engagement and support of various tiers of floor 28 at different locations. This allows not only for increased support strength of floor 28, but also for easy repair of floor 28. For example, due to loading and unloading of coal/coke from ovens 34, over time floor 28 exhibits damage thereto. Typically, this damage occurs on the top layer of floor 28, namely, tier T9. The design of corbel 300 (i.e., the support of two or more layers of floor 28) allows for tier T9 to be easily removed and a new tier T9 placed, without having to remove any other tier of floor 28. Since the entirety of floor 28 does not need to be replaced, battery 10 down time and labor cost is saved.

Since corbel 300 generally comprises tiers T5 and T6 and portions of tiers T4 and T7 through T9, existing seams created by the plurality of blocks that once comprised these tiers are eliminated—eliminating potential leak points of gas, and/or heat.

The following description should be taken in view of all of the aforementioned figures. Tapered portions 120A and 120B (of corbel 100), 240A and 240B (of corbel 200), and 340A and 340B (or corbel 300) form a V-shape when combined with a tapered portion of an adjacent corbel. This V-shape configuration funnels air, traveling in direction D1, into channels 40 (of coke oven 10 having corbel 100 therein), 250 (of corbel 200), and 350 (of corbel 300).

In a preferred embodiment, the horizontal through-bore of the respective gunblock sections of corbels 100, 200, 300 will have a first end and a second end, defined by a respective opening. One of the openings will have a recessed portion and the opposite opening will have a lip portion, or protruding portion, extending therefrom. The recess and lip are arranged to facilitate easy connection between two corbels, whereas the lip portion of the horizontal through-bore is arranged to be seated within the recessed portion of a horizontal through-bore of an adjacently placed corbel, as discussed supra. This arrangement increases the sealed nature of fluidly-connected horizontal through-bores of respective gunblock sections.

It will be appreciated that various aspects of the invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Coke oven battery
20 Regenerator
22 Pier or pillar
24 Regenerator region
26 Foundation
28 Floor
30 Heating wall
32 Flue
34 Oven
36 Oven ceiling
38 Battery top
40 Channel of coke oven battery 10
42 Vertical through-bore of coke oven battery 10
100 Corbel
101 Gunblock section of corbel 100
102 Base of corbel 100
102A Top end of corbel 100
103 First end of corbel 100
104 Second end of corbel 100
105 Through-bore of gunblock section 101
106 First opening of through-bore 105
106A Recess of first opening 106
107 Second opening of through-bore 105
107A Lip of second opening 107
108 First side of corbel 100
109 Second side of corbel 100
110 Vertical through-bore of gunblock section 101
120A Tapered portion of side 108
120B Tapered portion of side 109
122A Shoulder of side 108
122B Shoulder of side 109
124A First side of gunblock section 101
124B Second side of gunblock section 101
126A Groove of shoulder 122A
126B Groove of shoulder 122B
200 Corbel
201 Gunblock section of corbel 200
202 Base of corbel 200
202A Top end of corbel 200
203 First end of corbel 200
204 Second end of corbel 200
205 Through-bore of gunblock section 201
206 First opening of through-bore 205
206A Recess of first opening 206
207 Second opening of through-bore 205
207A Lip of second opening 207
208 First side of corbel 200
209 Second side of corbel 200
210A First vertical through-bore of gunblock section 201
210B Second vertical through-bore of gunblock section 201
230A First recess of top end 202A
230B Second recess of top end 202A
240A Tapered portion of side 208
240B Tapered portion of side 209
241A First planar end of side 208
241B First planar end of side 209
242A First ledge of side 208
242B First ledge of side 209
243A Second planar end of side 208
243B Second planar end of side 209
244A Second ledge of side 208
244B Second ledge of side 209
245A Third planar end of side 208
245B Third planar end of side 209
250 Channel of corbel 200
300 Corbel
301 Gunblock section of corbel 300
302A Top end of corbel 300
302B Bottom end of corbel 300
303 First end of corbel 300
304 Second end of corbel 300
305 Through-bore of gunblock section 301
306 First opening of through-bore 305

307 Second opening of through-bore 305
308 First side of corbel 300
309 Second side of corbel 300
310A First vertical through-bore of gunblock section 301
310B Second vertical through-bore of gunblock section 301
330A First recess of top end 302A
330B Second recess of top end 302A
340A Tapered portion of side 308
340B Tapered portion of side 309
341A First planar end of side 308
341B First planar end of side 309
342A First ledge of side 308
342B First ledge of side 309
343A Second planar end of side 308
343B Second planar end of side 309
344A Second ledge of side 308
344B Second ledge of side 309
345A Third planar end of side 308
345B Third planar end of side 309
350 Channel of corbel 300
360A Base of side 308
360B Base of side 309
362A Protrusion of base 360A
362B Protrusion of base 360B
D1 Direction
D2 Direction
D3 Direction
D4 Direction
D5 Direction
D6 Direction
T1 Tier
T2 Tier
T3 Tier
T4 Tier
T5 Tier
T6 Tier
T7 Tier
T8 Tier
T9 Tier

What is claimed is:
1. A corbel for a coke oven, comprising:
a base having a first side and a second side;
a gunblock section integral with said base, said gunblock section having a longitudinal through-bore extending from a first end to a second end, said gunblock section includes a top end extending therefrom, said top end having at least one recess disposed therein;
at least one substantially vertical through-bore arranged within said gunblock section, said at least one substantially vertical through-bore in communication with said longitudinal through-bore, said at least one substantially vertical through-bore has a second opening disposed within said at least one recess; and,
a substantially angular channel proximate said first end of the gunblock section, said substantially angular channel having an opening arranged within a group consisting of:
said first side of said base; and,
said second side of said base.
2. The corbel for a coke oven recited in claim 1, wherein said longitudinal through-bore includes a recess proximate said first end of said gunblock section; and, said longitudinal through-bore includes a lip extending therefrom and arranged proximate said second end of said gunblock section.

3. The corbel for a coke oven recited in claim 2, wherein said recess of said longitudinal through-bore is arranged to accept a lip of a longitudinal through-bore of an adjacent corbel.
4. The corbel for a coke oven recited in claim 1, wherein said first side of said gunblock section includes at least one ledge; and, said second side of said gunblock section includes at least one ledge, wherein said at least one ledge of said first side is arranged to accept a block thereon, and wherein said at least one ledge of said second side is arranged to accept a block thereon.
5. The corbel for a coke oven recited in claim 1, wherein said substantially vertically-angular channel is closed by a second end of an adjacent corbel arranged to abut said first end of said corbel.
6. A corbel for a coke oven, comprising:
a gunblock section, said gunblock section having a longitudinal through-bore extending from a first end to a second end, said gunblock section having a first side and a second side extending therefrom, said gunblock section includes a top end and a bottom end extending therefrom, said top end having at least one recess disposed therein;
at least one substantially vertical through-bore arranged within said gunblock section, said at least one substantially vertical through-bore in communication with said longitudinal through-bore, said at least one substantially vertical through-bore has a second opening disposed within said at least one recess; and,
a substantially angular channel proximate said first end of the gunblock section, said substantially angular channel having an opening arranged within a group consisting of:
said first side; and,
said second side.
7. The corbel for a coke oven recited in claim 6, wherein said longitudinal through-bore includes a recess proximate said first end of said gunblock section; and said longitudinal through-bore includes a lip extending therefrom and arranged proximate said second end of said gunblock section.
8. The corbel for a coke oven recited in claim 7, wherein said recess of said longitudinal through-bore is arranged to accept a lip of a longitudinal through-bore of an adjacent corbel.
9. The corbel for a coke oven recited in claim 6, wherein said first side of said gunblock section includes at least one ledge; and said second side of said gunblock section includes at least one ledge, wherein said at least one ledge of said first side is arranged to accept a block thereon, and wherein said at least one ledge of said second side is arranged to accept a block thereon.
10. A corbel for a coke oven, comprising:
a gunblock section having a first end and a second end, said gunblock section having a longitudinal through-bore extending from said first end to said second end, said gunblock section having at least one substantially vertical through-bore therein, said at least one substantially vertical through-bore in communication with said longitudinal through-bore, said gunblock section further including at least one arrangement extending therefrom, said arrangement selected from a group consisting of:
a base, said base having a first side and a second side extending therefrom, said first side having a shoulder arranged thereon, said second side having a shoulder arranged thereon;

a base, said base having a first side and a second side extending therefrom, a substantially angular channel proximate said first end of the gunblock section, said substantially angular channel having an opening arranged within a group consisting of: said first side of said base; and, said second side of said base, said at least one substantially vertical through-bore has a second opening disposed within said at least one recess; and, a first side and a second side extending from said gunblock section, a substantially angular channel proximate said first end of the gunblock section, said substantially angular channel having an opening arranged within a group consisting of: said first side; and, said second side, said at least one substantially vertical through-bore has a second opening disposed within said at least one recess.

11. The corbel for a coke oven recited in claim 10, wherein said gunblock section has a top end, said top end having at least one recess disposed therein.

12. The corbel for a coke oven recited in claim 10, wherein said longitudinal through-bore includes a recess proximate said first end of said gunblock section; and, said longitudinal through-bore includes a lip extending therefrom and arranged proximate said second end of said gunblock section.

13. The corbel for a coke oven recited in claim 12, wherein said recess of said longitudinal through-bore is arranged to accept a lip of a longitudinal through-bore of an adjacent corbel.

\* \* \* \* \*